May 8, 1956     I. O. COOPER     2,744,581
SELF-PROPELLED WHEELED HANGAR FOR AIRPLANE WINGS
Filed March 13, 1951     2 Sheets-Sheet 1
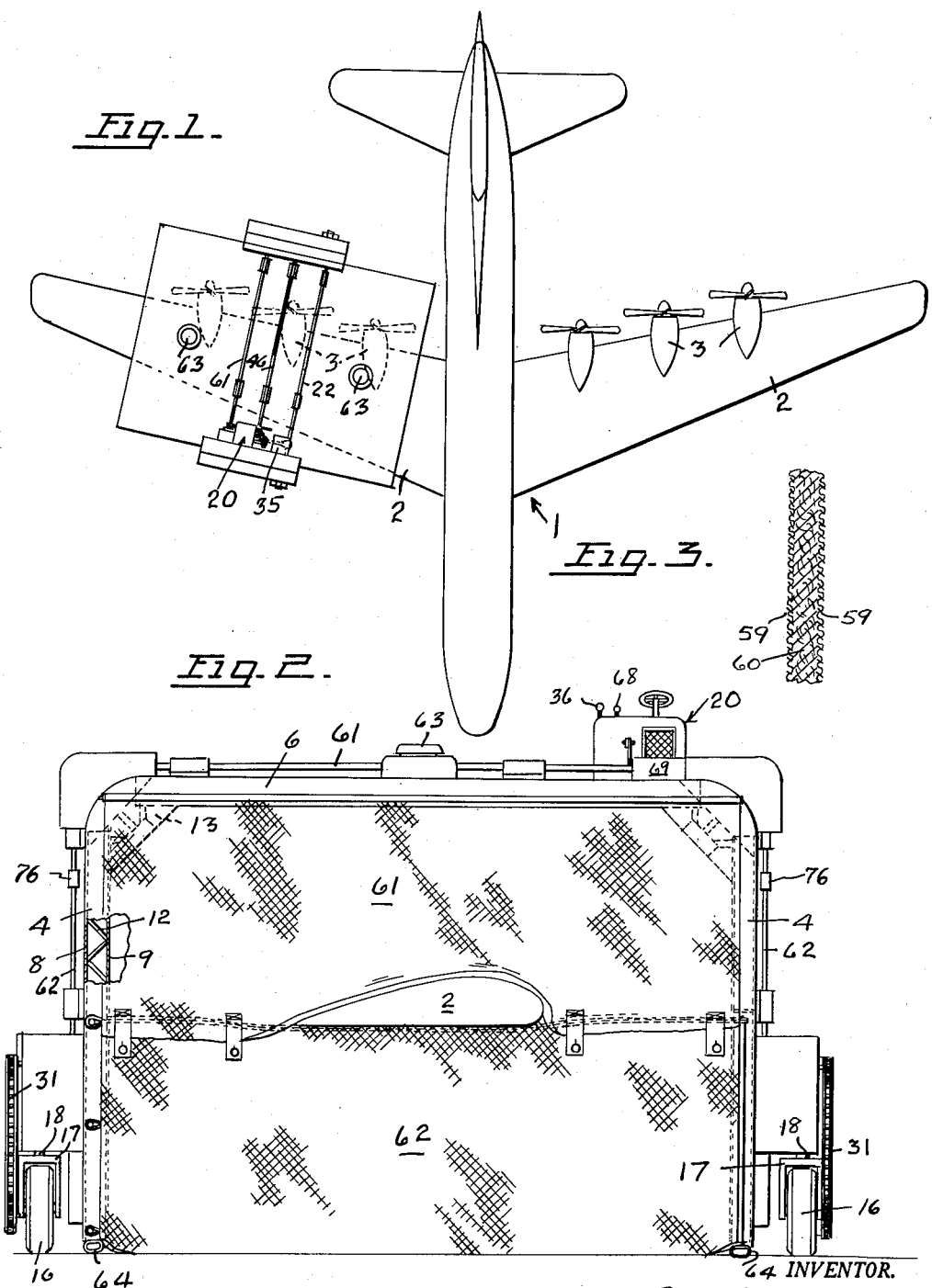
INVENTOR.
IVAN O. COOPER
BY
Boyken, Mohler & Beckley
ATTORNEYS

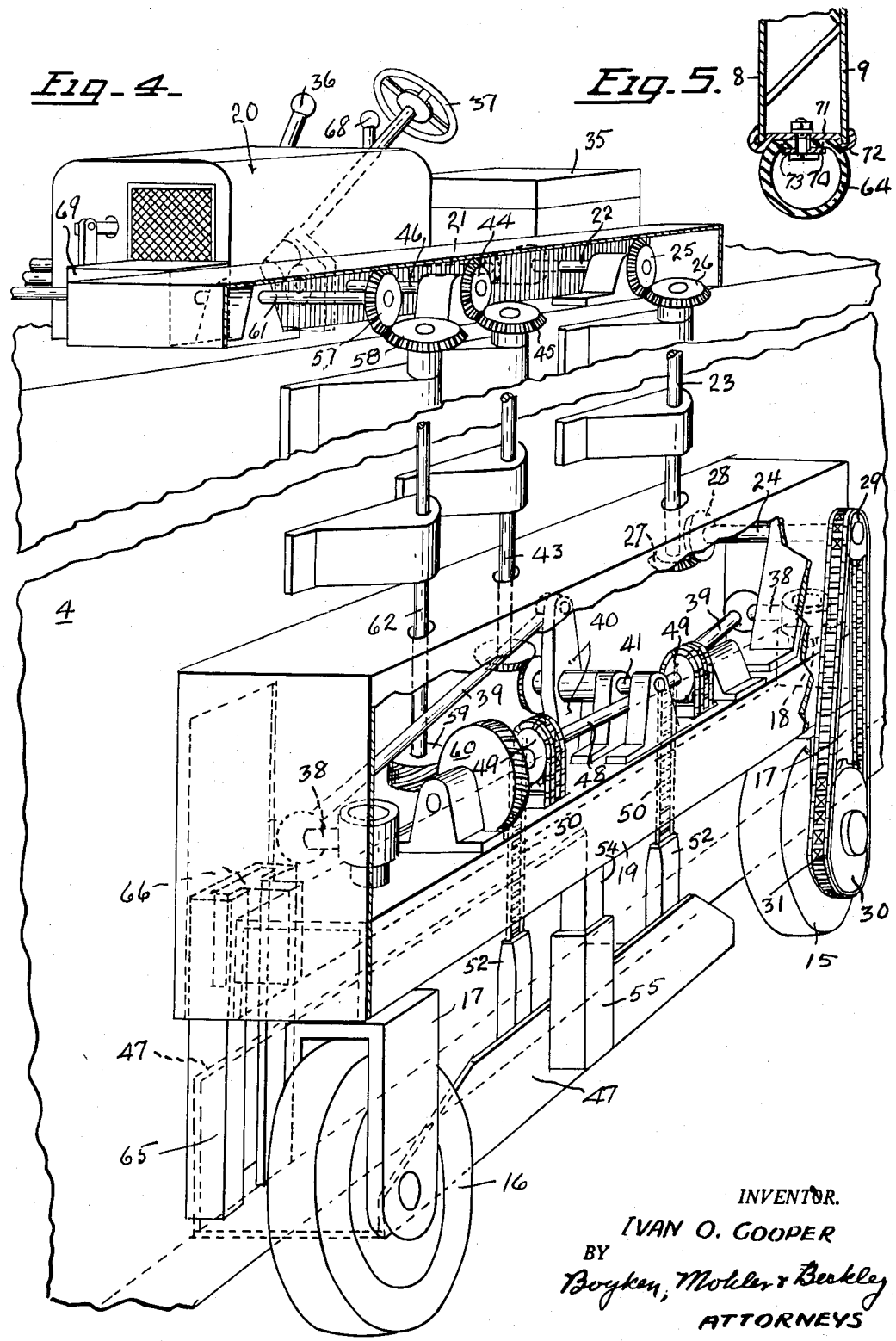

United States Patent Office 2,744,581
Patented May 8, 1956

2,744,581

SELF-PROPELLED WHEELED HANGAR FOR AIRPLANE WINGS

Ivan O. Cooper, San Mateo, Calif., assignor to California Eastern Airways, Inc., Oakland, Calif., a corporation of Delaware Application March 13, 1951, Serial No. 215,302

6 Claims. (Cl. 180—1)

This invention relates to a portable wing hangar for use in enclosing the engines and wings of aircraft during servicing and repairing the same.

Heretofore stationary hangars or hangars restricted to particular locations adjacent to landing fields have been employed. Such hangars have, of necessity, been large and expensive buildings occupying considerably more space than was actually required for servicing the engines. While servicing of aircraft outside of the hangars is, to some extent, possible during fair weather and moderate temperatures, such servicing cannot be done satisfactorily during hot or cold or inclement weather, hence, during such latter weather all activity must be restricted to the stationary hangars into which the aircraft is moved. Obviously, where airplanes of the largest type are serviced, such as the present day so-called B36 and B47 type aircraft, special facilities must be provided for indoor servicing, which facilities are so extensive and expensive that they are not common, and even where available, the capacity may be limited to only one airplane at a time. The time for servicing such large aircraft is a great many hours with a full ground crew, hence there is always the likelihood of aircraft being used where vitally needed and when such aircraft should be in the shop being serviced.

With the present invention, the hangar or hangars may be propelled or moved to any point or locality where the aircraft may be located and the engines and wings or wing sections enclosed and the aircraft serviced irrespective of weather conditions and temperature. The hangars are no larger than necessary for the servicing job. In most instances there is no necessity for the entire aircraft to be housed or enclosed in order to perform the necessary servicing. The hangars of the present inventor are relatively economical, and provide for all the essentials of a servicing shop, such as electrical power, compressed air, heaters, and electricity for welding and cutting.

One of the objects of this invention is the provision of a portable hangar of the above type that can be quickly positioned over a wing or wing section in engine enclosing relationship, and that can be quickly removed after a servicing job without the necessity for moving the aircraft into any particular position or to any particular place on an air field, and which hangar will fully protect the workmen during a servicing job.

The present invention is not concerned with any permanent installation that is not adapted to be moved at any time to any point in an air field. Wherever such permanent installations are employed, the disadvantages of being compelled to move each aircraft to the same and to jockey it into the hangar are present, and such advantages are overcome by the present invention.

In the drawings:

Fig. 1 is a top plan view of an airplane with the hangar shown over one wing.

Fig. 2 is an end view of the hangar showing a wing projecting therefrom. A portion of the hangar frame and end curtains are broken away to show frame structure.

Fig. 3 is a fragmentary enlarged sectional view taken through a portion of the curtain that is at opposite ends of the hangar.

Fig. 4 is an enlarged fragmentary perspective view showing the ground wheels at one side of the hangar and the hoisting mechanism, the housings for parts of the hoisting mechanism being broken away and sectioned.

Fig. 5 is an enlarged fragmentary sectional view of the means for sealing the lower edges of the hangar with the surface of the ground.

In detail Fig. 1 shows an aircraft 1, having wings 2 and engines 3 along said wings. It is immaterial, insofar as this invention is concerned, whether the aircraft being serviced or to be serviced is of the pusher or tractor type, or whether it has propellers, jet engines or a combination of both. A pusher type is shown for no reason other than illustrating how the hangar is used and its capabilities.

The hangar illustrated comprises vertically extending side walls 4 and a top wall 6. Said side walls and top wall are preferably of light but strong construction such as employed in aircraft, in which each wall consists of an outer metal sheet 8 and an inner sheet 9 in spaced opposed relation thereto, thus forming an inner and an outer skin, which skins are connected and braced by struts 12 that may be in the form of corrugated sheet metal or transversely corrugated strips. The precise structure may be varied, but in any event, said walls must be light and strong and have heat insulation characteristics. The air space between the sheets of each wall insures efficient heat insulation.

The upper corners of the hangar are provided with braces 13 that further brace the walls against relative movement, said braces 13 being at the junctures between the side walls and top wall.

The above described hangar does not have a bottom nor rigid end walls, and the structure itself, preferably vertically forms the frame of the hangar, or vehicle having ground wheels movable to any desired place on any air field or wherever the ground is sufficiently level to enable said movement.

The ground wheels comprise a pair of coaxial driven wheels 15, one at each of the oppositely outer facing sides of said side walls 4, and a second pair of coaxial wheels 16 spaced from wheels 15 along said oppositely outwardly facing sides. More wheels may be employed if desired, but at least four should normally be used and there may, of course, be dual wheels if the weight of the hangar should be such as to require it. However, dual wheels would complicate the steering mechanism, hence single wheels have heretofore been found to be adequate and are preferable.

The wheels 15, 16 are so arranged relative to the center of gravity of the hangar as to support the hangar in a stable position during movement of the hangar over the ground. The wheels 15, 16 do not have through axles, but instead, each preferably has its own axle extending between the lower ends of a fork 17 between the arms of which each wheel extends. Each fork has a vertical spindle 18. The spindles of the forks carrying wheels 15, 16 at each side of the hangar are journalled for rotation about vertical axes in the ends of a horizontally extending frame member 19 that is at each of said sides of said hangar.

A motor 20 is preferably carried on the hangar, or it may be carried by either frame 19, according to which is most convenient. Said motor may be a conventional automobile or truck engine and is adapted to drive the wheels 15 in one direction or the other through any suitable power transmission means, such as shafts 21, 22, 23 and 24 and suitable gearing 25, 26, 27, 28 and sprocket wheels 29, 30 and relatively long flexible chains 31 connecting said shafts with said wheels for driving the latter. A conventional gear shift in the power line provides for different speeds and for reverse driving of the wheels 15. The aforesaid drive in itself is not new but has been heretofore used in motor vehicles.

The driver's seat 35 is adjacent to the gear shifting lever 36 and to a steering wheel 37, and said seat is preferably either above the hangar or elevated sufficiently to enable the driver to properly maneuver the hangar over a wing of the aircraft.

The steering mechanism is not new in itself, and comprises laterally projecting arms 38 respectively secured to the upper ends of spindles 18, which arms are swivelly connected at their outer ends, at each side of the hangar, with one end each of a pair of links 39. These links extend inward toward each other at each side of the hangar and are respectively pivotally connected at their adjacent ends with the outer ends of a pair of arms 40 that extend oppositely outwardly of a horizontal shaft 41 that is rotatable in a bearing secured to frame member 19.

From the above, it will be apparent that rotation of shafts 41 on each member 19 in one direction will effect rotation of the spindles 18 connected with wheels 15 in one direction and the rotation of spindles 18 connected with wheels 16 in the opposite direction. The effect of that is to double the effective turning movement of the hangar over that which would occur were only one set of wheels to be turned, which is desirable in this instance due to the fact that the degree of rotation of the spindles 18 is limited because of the near proximity of the wheels to the hangar.

This rotation of said shafts 41 is accomplished through vertical shafts 43 that are each rotatable in bearings secured to the opposite outwardly facing sides of the hangar, and which shafts are connected at their upper ends through gears 44, 45 with a horizontal shaft 46 that extends across the top of the hangar and that is rotated in one direction or the other through a gear connection with the steering wheel 37.

Connected with each of the side walls 4 are horizontally elongated plates 47 that may be welded or bolted to said side walls or secured thereto in any other suitable manner.

Above each member 19 is a horizontal shaft 48 that is journalled therein for rotation. A pair of spaced sprocket wheels 49 are secured to each shaft, and over each wheel extends a heavy sprocket chain 50 that is secured to its corresponding wheel and connects at its lower end with the upper end of a vertical post 52 (Fig. 4) that in turn is secured to an end of plate 47.

A central post 54 may be carried by each frame member 19 centrally between the pair of posts 52 at each side of the frame, and may slidably extend into a guide member 55 connected with each plate 47.

Each shaft 48 is connected by gears 57, 58, 59, 60 and shafts 61, 62 with a power take-off from motor 20 for rotating the shafts 48 in one direction or the other so as to effect a hoisting of the hangar so it will be supported on the wheels when shafts 48 are rotated in one direction and for lowering the hangar onto the ground when the shafts are rotated in an opposite direction. Any suitable clutch and transmission mechanism between the engine and the power take-off for effecting the transmission of power to the shafts 48 for rotating them in one direction or the other may be used. There is nothing novel in such control mechanism in itself.

A conventional spline connection 76 (Fig. 2) may be provided to connect the upper and lower ends of shafts 23, 43, 62 so as to permit rotation of said shafts and at the same time allow vertical relative movement between said ends.

Inasmuch as the present hangar is intended to protect the workmen therein during a servicing job, it is important that the hangar be reasonably tight. Therefore relatively heavy flexible sealing members 64 are along the lower edges of the side walls. These members are preferably hollow tubing that will conform to irregularities in the surface of the ground when the hangar is lowered onto the ground. Thus a relatively tight seal between the side walls and the ground is provided.

Flexible end walls for the hangar may consist of curtains, each of which may be formed of strong flexible machine quilted Grade A wing covering cloth 59 sandwiching a batten 60 of spun glass.

Each end closure may be in two sections, one section 61 to be rolled down from the top of the hangar to the top of the wing and the other section 62 to be rolled from one side of the hangar to the other in joining relation to the lower edge of the upper section 61 to the wing, and to then extend below the wing and to the other side of the hangar to which it may be secured by any suitable means, such as hooks. The upper edge of the lower section may have a length of aircraft shock cord incorporated therein to hold it yieldably against the lower side of the wing. If desired, any suitable lacing, zippers, or snaps may be provided for holding the upper and lower sections together where they extend from the edges of the wings to the side walls, but normally the upper section will overlap the lower section so as to enable the sections to make a relatively tight seal with wings of different types or models of aircraft. In any event, these end walls are flexible and of heat insulating properties, and are arranged to be carried by the hangar against the walls so as to leave the ends of the hangar open when the hangar is being moved from one place to the other or is not in wing enclosing relation.

In operation, it will be seen that the operator in seat 35 will elevate the hangar for moving the same over the ground, and the hangar may then be quickly driven under its own power to the airplane to be serviced. It is then moved over a wing longitudinally of the latter to a position in which the engines are between the ends of the hangar. The hangar is then lowered onto the ground and the end curtains are then unrolled and fastened in sealing relation around the wings.

Ventilators 63 in the top may be provided for escape of fumes and a generator connected with the engine 20 may provide lighting for the workmen, as well as electrical power and heat.

After the job of servicing is completed, the end curtains are rolled up and the hangar again elevated and driven to a new job, or if desired, it can be moved along the same wing to another section, or to the other wing. Obviously any number of such hangars may be used on any one job.

The details of the hoisting and moving mechanism hereon shown are not to be considered as being restrictive, inasmuch as it is obvious that hydraulic means may be employed for raising and for lowering the hangar.

The provision of the motor for performing the work of moving the hangar and for the elevating and lowering it, also provides power for operating a generator to supply electricity for lights, heat and electrical power for various electrical tools.

Each hangar may be speedily moved to any part of the landing field where the surface is sufficiently level to enable such movement. Most landing fields, particularly for the larger aircraft are suitable. The hoisting mechanism is adequate to elevate the hangars from four to six feet off the ground. Usually much less elevation is adequate.

One means for insuring the stability of the hangar on the wheels and wheel carrying carriages is the provision of tracks or guides 65 secured to the side walls of the hangar (Fig. 4). Blocks 66 rigid with the wheel carriage are virtually slidable in said guides or tracks so at any elevation of the hangar the wheel carriages will be held thereto. It may be noted that the conventional coil springs may be between the frame members 19 and the wheel forks. These are not shown but their positions would normally be around the spindles 18, of course there is no absolute necessity for springs in most instances.

The guides 65 are normally about opposite the wheels 15, 16 at each end of the member 19 that is at each side of the hangar. Any other suitable means may be employed for securing the wheel carriages to the hangar, and in the above example, it is obvious that the post 54 and guide 55 contribute to the desired result.

The mechanism shown in Fig. 4 is duplicated at each side of the hangar, except for the motor 20 and transmissions associated therewith.

The drive for wheels 15 is easily controlled by the conventional transmissions, and there is a differential armed shaft 22, as seen in Fig. 4 in dash lines under seat 35. The lever 68 may control the transmission in housing 69, which transmission may be of any suitable kind.

As to the flexible member 64 that seals the lower edges of the hangar with the ground, this is illustrated in Fig. 5. The tubular flexible member 64 may be constructed along the order of a tire casing but with a wall 70 secured against a flat plate 71 that is secured along the lower edges of walls 8, 9. The edges may be rounded as at 72 to preclude any likelihood of injury upon the tube tending to flatten out along the ground. Inasmuch as the tube is resilient it will automatically resume its normal shape as seen in Fig. 5 when the hangar is elevated off the ground. A metal plate 73 may be inside said member 64 to insure a snug securement of the wall 70 to plate 71.

I claim:

1. A wing hangar having opposed side walls, a top and one open end to enable movement of said hangar longitudinally of a wing of an airplane from the outer end of said wing to a position extending over the engines on said wing, ground wheels supporting said hangar elevated above the ground for movement thereover to said position, means for lowering said hangar to a lowered position on the ground when the latter is in said position including a hoist mechanism connecting said wheels and said hangar for vertical reciprocable movement of said hangar between said lowered position and said elevated position, a member carried by said side walls and extending below the lower edges thereof for engagement with the ground and supporting a portion of the weight of said hangar when said hangar is in said lowered position, said member being flexible to conform to irregularities in the surface contour of the ground when said hangar is in said lower position.

2. A wing hangar having opposed side walls, a top and one open end to enable movement of said hangar longitudinally of a wing of an airplane from the outer end of said wing to a position extending over the engines on said wing, ground wheels supporting said hangar elevated above the ground for movement thereover to said position on the ground when the latter is in said position including a hoist mechanism connecting said wheels and said hangar for vertical reciprocable movement of said hangar between said lowered position and said elevated position, said ground wheels including a pair of power driven wheels respectively adjacent opposite sides of said hangar, a power unit in driving connection with said wheels, said ground wheels further including steering wheels supported for movement about vertical axes for controlling the direction of movement of said hangar and a steering mechanism connected with said steering wheels for causing their said movement.

3. A self propelled, portable wing hangar having opposed side walls, a top, an open bottom and open ends to enable movement of said hangar longitudinally of a wing of an airplane from the outer end of said wing to a position extending over the engines on said wing, ground wheels on said hangar and a hoist mechanism supporting said hangar on said wheels for vertical movement from an elevated position of said hangar above the ground to a lowered position in which said hangar is on the ground and vice versa whereby said hangar may be moved to and from a position over said wing with the latter extending through its open ends, means for actuating said hoist mechanism, including a motor connected with certain of said ground wheels for driving the latter, and flexible heat insulation curtains at said opposite ends of said hangar for closing said ends about such wing when the said hangar is over said wing.

4. A self propelled, portable wing hangar having opposed side walls, a top, an open bottom, and open ends to enable movement of said hanger longitudinally of a wing of an airplane from the outer end of said wing to a position extending over the engines or said wing, ground wheels on said hangar and a hoist mechanism supporting said hangar on said wheels for vertical movement from an elevated position of said hanger above the ground to a lowered position in which said hangar is on the ground and vice versa whereby said hangar may be moved to and from a position over said wing with the latter extending through its open ends, means for actuating said hoist mechanism, including a motor connected with certain of said ground wheels for driving the latter, and flexible heat insulation curtains at said opposite ends of said hangar for closing said ends about such wing when the said hangar is over said wing, the respective walls of said hangar comprising inner and outer spaced layers of relatively thin rigid sheet material, strut bracing between said layers for bracing them and holding them together in rigid relationship and for providing an air space for heat insulation, a flexible member along the lower edges of the side walls adapted to support the hanger on the ground when in lowered position and to follow irregularities in the contour of said ground to provide sealing engagement with the ground.

5. A self propelled, portable wing hangar having opposed vertical side walls, a top wall, an open bottom, and flexible end walls, said side walls being of sufficient height to extend above the leading and trailing edges of an airplane wing when their lower edges are on the ground and to support said top wall above such wing and engines on the latter including propellers, the length of said hangar being sufficient to extend over said engines, means for releasably securing said flexible end walls in positions in substantially sealing engagement with the outer surface of said wing when said hangar is over said wing with the said engines between said end walls, a plurality of spaced ground wheels at opposite sides of said hangar and a hoist mechanism on said wheels connected with said hangar for elevating said hangar to a position supported by said wheels for movement of the hangar over the ground, power means carried by said wheels connected with certain of the latter for driving them and connected with said hoist mechanism for raising and for lowering said hangar, and a steering mechanism connected with certain other of said wheels for turning them about vertical axes to control the direction of movement of said hangar.

6. A wing hangar having opposed side walls, a top and being open at its opposite ends to enable movement of said hanger longitudinally of a wing of an airplane from the outer end of said wing to a position extending over the engines on said wing with said wing extending through said ends, ground wheels supporting said hangar elevated above the ground for movement thereover to said position, means for lowering said hangar to a lowered position on the ground when hangar is in said position including a hoist mechanism connecting said wheels and said hangar for vertical reciprocable movement of said hangar between said lowered position and said elevated position, and flexible end walls at the ends of said hangar movable to positions closing the said ends of said hangar around said wing, power means carried by said hangar and operatively connected with said wheels, a steering station on the top of said hangar for an operator from which said wheels and said hoist may be operated.

References Cited in the file of this patent

UNITED STATES PATENTS

| | | |
|---|---|---|
| D. 137,171 | Blaski | Feb. 1, 1944 |
| 302,535 | Holabird | July 22, 1884 |
| 1,470,557 | Eremeeff | Oct. 9, 1923 |
| 2,228,454 | Hamilton | Jan. 14, 1941 |
| 2,652,906 | Mitchell | Sept. 22, 1953 |

FOREIGN PATENTS

| | | |
|---|---|---|
| 570,020 | France | Apr. 22, 1924 |